(12) United States Patent
Wool

(10) Patent No.: US 7,801,057 B2
(45) Date of Patent: Sep. 21, 2010

(54) METHOD AND APPARATUS FOR CONVERTING A ROUTING TABLE INTO A COLLECTION OF DISJOINT ZONES

(75) Inventor: Avishai Wool, Petah Tikva (IL)

(73) Assignee: AlgoSec Systems Ltd., Petah Tikva (IL)

( * ) Notice: Subject to any disclaimer, the term of this patent is extended or adjusted under 35 U.S.C. 154(b) by 1081 days.

(21) Appl. No.: 11/365,616

(22) Filed: Mar. 2, 2006

(65) Prior Publication Data

US 2006/0200580 A1 Sep. 7, 2006

Related U.S. Application Data

(60) Provisional application No. 60/658,751, filed on Mar. 7, 2005.

(51) Int. Cl.
*H04J 1/16* (2006.01)
*H04L 12/28* (2006.01)

(52) U.S. Cl. .................. 370/254; 370/252; 370/389; 370/401

(58) Field of Classification Search .................. 370/389, 370/252, 254, 401
See application file for complete search history.

(56) References Cited

U.S. PATENT DOCUMENTS

| 6,760,330 | B2 * | 7/2004 | Tahan .......................... 370/389 |
| 7,451,483 | B2 * | 11/2008 | Chang et al. ................... 726/15 |
| 2005/0018683 | A1 * | 1/2005 | Zhao et al. .................... 370/393 |
| 2005/0102423 | A1 * | 5/2005 | Pelavin et al. ................ 709/238 |
| 2006/0056297 | A1 * | 3/2006 | Bryson et al. ................ 370/230 |

OTHER PUBLICATIONS

U.S. Appl. No. 09/483,876, filed Jan. 18, 2000, A. Mayer et al.

(Continued)

*Primary Examiner*—John Pezzlo
(74) *Attorney, Agent, or Firm*—Martin Fleit; Paul D. Bianco; Fleit Gibons Gutman Bongini & Bianco PL

(57) ABSTRACT

The present invention discloses a method for analyzing an IP Gateway's Routing Table for identifying sets of IP addresses ("Disjoint Zones") communicating through the same Gateway, said method comprising the steps of: identify subnets of IP addresses which are directly connected to the Gateway ("directly-connected subnets") via a network interface card ("NIC"); associate every route in the Routing Table with a NIC; identify and sort the Routing Table's Critical Points, at which the routing decision may change between successive IP addresses, and identifying Disjoint Zones of IP addresses by locating all the Critical Points at which the routing decision in fact changes between successive IP addresses.

According to a further option of the present invention, an External Disjoint Zone is identified in accordance with the NIC which is associated with the default route.

According to alternative option of the present invention, the External Disjoint Zone is identified in accordance with trust levels as defined by the user.

According to additional option of the present invention the users are enabled to identify the Disjoint Zone types in accordance with their preferences using a graphical interface.

The method may be reduced to practice in the form of a software program that can be executed on a standard personal computer with a standard operating system. A preferred embodiment is an Intel x86-based PC running the RedHat Linux operating system.

9 Claims, 3 Drawing Sheets

OTHER PUBLICATIONS

U.S. Appl. No. 10/336,874, filed Jan. 6, 2003, Y. Bartal et al.
U.S. Appl. No. 11/175,781, filed Jul. 7, 2005, A. Wool.
A. Mayer, A. Wool, and E. Ziskind. Offline Firewall Analysis. International Journal of Information Security. Springer-Verlag, 2005.
A. Wool, Architecting the Lumeta Firewall Analyzer. Proc. USENIX Security Symposium, Washington, D.C., 2001.
A. Wool. A quantitative study of firewall configuration errors. IEEE Computer, 37(6):62-67, 2004.
C. Huitema. Routing in the Internet (2nd Edition). Prentice-Hall, 2000.
W.R. Stevens. TCP/IP Illustrated, vol. 1: The Protocols. Addison-Wesley, 1994.

* cited by examiner

Figure 1: Example of a Routing Table, produced by the Microsoft Windows "route print" command. The first route (underlined with a dotted line) denotes the default route.

```
Network Destination        Netmask          Gateway       Interface  Metric
          0.0.0.0          0.0.0.0    208.19.102.125   208.19.102.2       1
         10.0.0.0          255.0.0.0      10.5.1.254        10.5.1.2      1
         10.1.2.0      255.255.255.0      10.1.2.12        10.1.2.1       1
         10.1.2.1    255.255.255.255       127.0.0.1       127.0.0.1      1
        10.1.2.12    255.255.255.255       127.0.0.1       127.0.0.1      1
         10.5.1.0      255.255.255.0        10.5.1.2        10.5.1.2      1
         10.5.1.2    255.255.255.255       127.0.0.1       127.0.0.1      1
       10.5.1.100    255.255.255.255       127.0.0.1       127.0.0.1      1
         10.6.3.1    255.255.255.255   199.248.120.253  199.248.120.1     1
        10.10.0.0          255.255.0.0     10.5.1.254       10.5.1.2      1
        10.50.0.0       255.255.255.0      10.50.0.2       10.50.0.1      1
        10.50.0.1    255.255.255.255       127.0.0.1       127.0.0.1      1
        10.50.0.2    255.255.255.255       127.0.0.1       127.0.0.1      1
     10.254.254.0       255.255.255.0    10.254.254.1    10.254.254.1     1
     10.254.254.1    255.255.255.255       127.0.0.1       127.0.0.1      1
   10.255.255.255    255.255.255.255       10.50.0.2       10.50.0.1      1
```

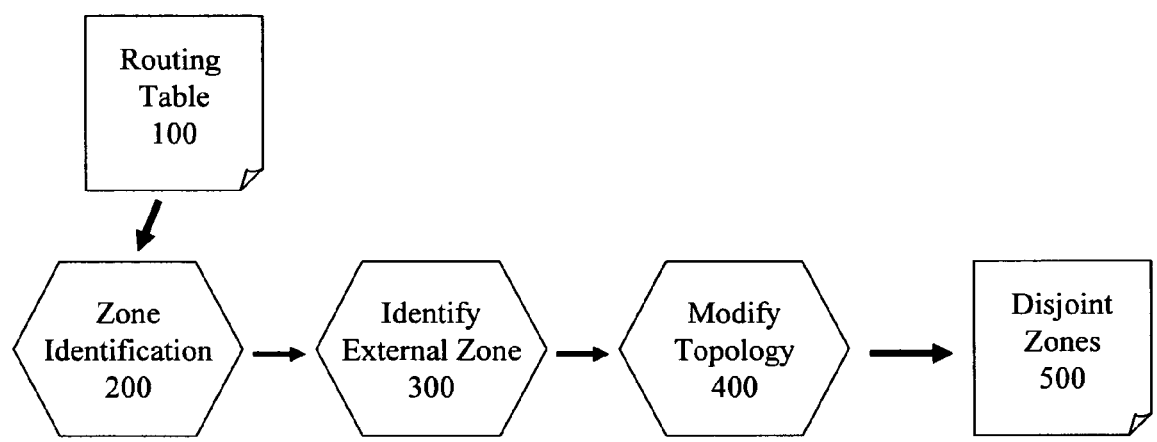
Figure 2: The conversion phases

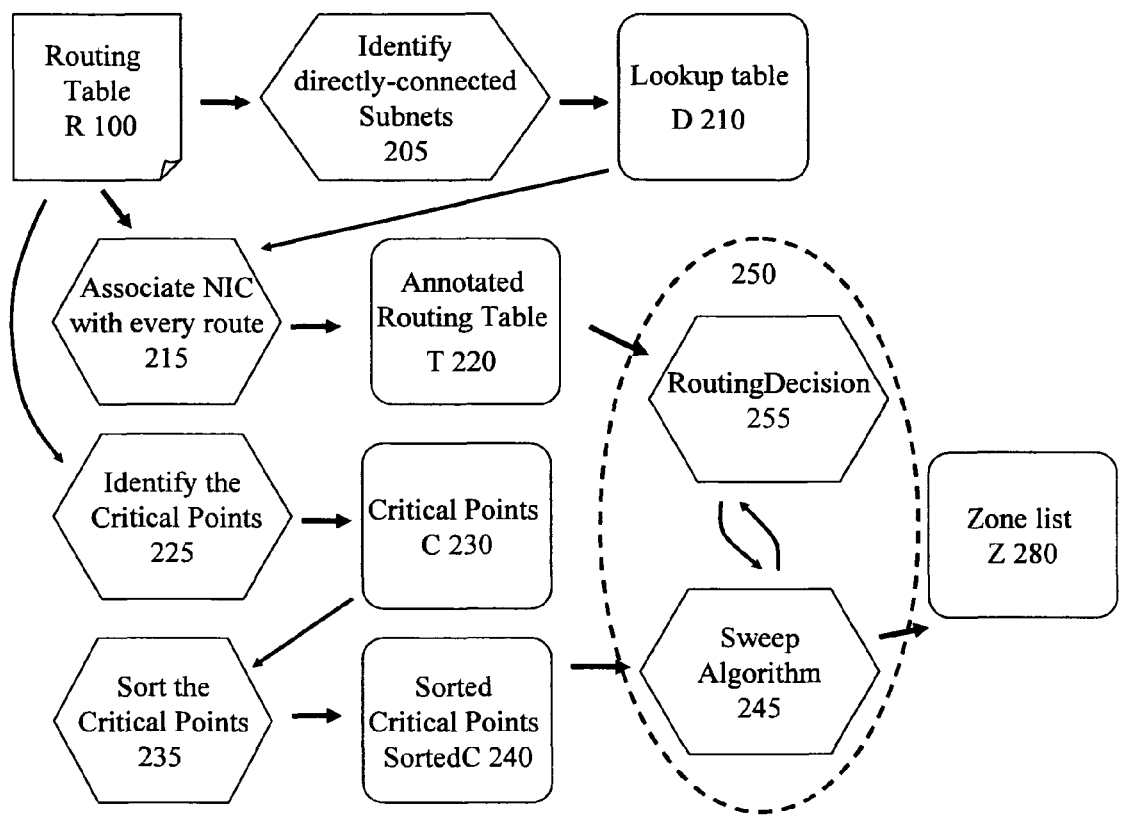
Figure 3: The steps of the Zone Identification phase (200)

METHOD AND APPARATUS FOR CONVERTING A ROUTING TABLE INTO A COLLECTION OF DISJOINT ZONES

CROSS REFERENCE TO RELATED APPLICATIONS

The application is a continuation of provisional U.S. patent application Ser. No. 60/658,751, filed Mar. 7, 2005.

FIELD OF THE INVENTION

The present invention relates generally to Internet routers and Internet firewalls, and more particularly, to a method and apparatus for converting the Routing Table maintained by such devices into a collection of disjoint Zones.

BACKGROUND OF THE INVENTION

The present invention generally relates to Internet routers and Internet firewalls: devices that participate in the Internet Protocol (IP) and route IP packets. Herein we shall refer to any such IP device as a Gateway.

A Gateway is a device that routes packets. Therefore, it maintains a data structure called a Routing Table. When the Gateway needs to route an IP packet to a destination's IP address, the Gateway consults its Routing Table to select the IP address of the next hop along the path to the destination. When the path to a destination IP address crosses a particular Gateway's network interface cards (NIC), we say that said destination IP address is located behind said NIC. Herein we shall refer to the complete set of IP addresses that are located behind one of a Gateway's as the Zone behind the NIC. According to the manner of operation of Gateways, every possible IP address may appear behind at most one Zone—thus the Zones are in fact Disjoint. To emphasize this point we refer to the Zones also as Disjoint Zones.

Computing the complete Zone behind each NIC on the Gateway facilitates performing various types of offline analysis, as described in the prior work of [Mayer et al. 2000]; [Wool 2001]; [Wool 2004]; and [Mayer et al. 2005]. These works teach how to analyze Firewall or Router Configurations and produce HTML-based Firewall Analyzer Reports. Moreover, to facilitate said analyses, said Zones need to be marked with a Zone Type according to their location and usage in the Gateway's topology: whether the Zone is External or Internal or a DMZ.

A person of familiar with the art may extract the Routing Table from the Gateway and display it in a printable format. Said person may further emulate the Gateway's routing decision process, for a given destination IP address, by using a computer program that employs well known algorithms as described in [Huitema'2000]. However, using the current state of the art, calculating all the IP addresses in each Disjoint Zone, is extremely inefficient: Naively, one would need to emulate the Gateway's routing decision for each one of the billions of possible IP addresses (precisely, in IP version 4, which is the commonly used protocol version in 2006, there are 2 to the power of 32 possible IP addresses).

Furthermore, a person of familiar with the art may specify the Zone Types manually. However this requires a manual procedure and sometimes requires specific knowledge about the Gateway, knowledge that may not be immediately available to the system user.

As apparent from the above-described deficiencies with conventional techniques for calculating all the IP addresses behind each Zone, a need exists for automatically identifying the Disjoint Zones and setting their Zone Types.

BRIEF SUMMARY OF THE INVENTION

The present invention discloses a method for analyzing an IP Gateway's Routing Table for identifying sets of IP addresses ("Disjoint Zones") communicating through the same Gateway, said method comprising the steps of: identify subnets of IP addresses which are directly connected to the Gateway ("directly-connected subnets") via a network interface card ("NIC"); associate every route in the Routing Table with a NIC; identify and sort the Routing Table's Critical Points, at which the routing decision may change between successive IP addresses, and identifying Disjoint Zones of IP addresses by locating all the Critical Points at which the routing decision in fact changes between successive IP addresses.

According to a further option of the present invention, an External Disjoint Zone is identified in accordance with the NIC which is associated with the default route.

According to alternative option of the present invention, the External Disjoint Zone is identified in accordance with trust levels as defined by the user.

According to additional option of the present invention the users are enabled to identify the Disjoint Zone types in accordance with their preferences using a graphical interface.

The method may be reduced to practice in the form of a software program that can be executed on a standard personal computer with a standard operating system. A preferred embodiment is an Intel x86-based PC running the RedHat Linux operating system.

A more complete understanding of the present invention, as well as further features and advantages of the present invention, will be obtained by reference to the following detailed description and drawings.

BRIEF DESCRIPTION OF THE DRAWINGS

FIG. 1 is an example of a Routing Table
FIG. 2 illustrates the invention's conversion phases
FIG. 3 illustrates the steps of the Identify Zones phase

DETAILED DESCRIPTION OF THE INVENTION

Definitions and Background

The present invention generally relates to Internet routers and Internet firewalls: devices that participate in the Internet Protocol (IP) and route IP packets. Herein we shall refer to any such IP device as a Gateway.

A Gateway has a plurality of network interface cards (NIC). Each NIC is attached to a subnet (usually a Local Area Network (LAN)).

A Gateway is a device that routes packets. Therefore, it maintains a data structure called a Routing Table. When the Gateway needs to route an IP packet to a destination's IP address, the Gateway consults its Routing Table to select the IP address of the next hop along the path to the destination.

If the destination's IP address belongs to one of the subnets that the Gateway is attached to, via one of its NICs, then the next hop is the destination itself. Otherwise, if the destination does not belong to one of the subnets that the Gateway is attached to, then the next hop IP address is some other Gateway—and this other Gateway does belong to one of the subnets that the Gateway is attached to. Thus, in either case, the next hop along the path to the destination goes through one of the subnets that the Gateway is attached to—and crosses the Gateway's NICs that is attached to said subnet. Therefore, when the path to a destination IP address crosses a particular Gateway's NIC, we say that said destination IP address is located behind said NIC.

Herein we shall refer to the complete set of IP addresses that are located behind one of a Gateway's network interface cards (NIC) as the Zone behind the interface. Thus there is one Zone behind each NIC.

A Gateway's Routing Table fully determines the routing decision for each destination IP address. Thus, each destination IP address, that the Gateway can route to, is behind a single interface. This means that the Zones are Disjoint: no IP address can appear in more than one Zone.

A person of familiar with the art may extract the Routing Table from the Gateway and display it in a printable format, such as that shown in FIG. 1. Said person may further emulate the Gateway's routing decision process, for a given destination IP address, by using a computer program that employs well known algorithms as described in [Huitema'2000]. However, using the current state of the art, calculating all the IP addresses in each Disjoint Zone, is extremely inefficient: Naively, one would need to emulate the Gateway's routing decision for each one of the billions of possible IP addresses (precisely, in IP version 4, which is the commonly used protocol version in 2006, there are 2 to the power of 32 possible IP addresses).

The first part of the invention described herein provides an efficient method for converting the Gateway's Routing Table into a Collection of Disjoint Zones.

Furthermore, this invention deals with Zone Types. A Zone's Type is a label that identifies how the IP addresses within the Zone relate to the organization owning the Gateway. A Zone may have one of the following types:

1. INTERNAL: the IP addresses in the Zone belong to the organization
2. EXTERNAL: the IP addresses in the Zone are outside the organization's perimeter (e.g., the Zone containing the public Internet would typically be marked as EXTERNAL.
3. DMZ: the IP addresses in the Zone are part of the organization's DeMilitarized Zone (e.g., IP addresses that belong to the organization but are used for publicly-available servers)

Other Zone Types may be added without changing the current invention.

A further aspect of the invention described herein provides automatic methods for assigning a Zone Type to each Zone, and furthermore, provide manual methods for the user operator to edit and override the results of said automatic methods of assigning a Zone Type to a Zone.

Routing Table Basics

A full explanation of IP routing is beyond the scope of this document. The interested reader is referred to [Stevens'94, Huitema 2000]. Below we only touch upon the points that are relevant to the preset invention.

In IPv4, every IP Gateway maintains its routing information in the form of a Routing Table. Each entry in the table is called a route, and describes how the Gateway should deal with packets destined to a given range of IP addresses. The range of addresses described by a route is always a subnet, specified as a CIDR (Classless InterDomain Routing) block: i.e., it is specified as an IP address, with a netmask that indicates which bits are "don't-care" bits.

The Routing Table distinguishes between routes to directly-connected subnets, and to all other IP addresses and subnets. Directly-connected subnets are subnets of Local Area Networks (LANs) that the Gateway is connected to via one of its NICs. In particular, the IP address of that NIC belongs to the said directly-connected subnet. The Gateway can communicate with IP addresses on a directly-connected subnet using layer-2 protocols (such as Ethernet). To communicate with other IP addresses, the Gateway must send its packets via some other Gateway. Thus, for directly-connected subnets, the Routing Table lists the NIC which is connected to the subnet. For other subnets the Routing Table lists the IP address of the next-hop Gateway.

When a routing decision is being made for a given IP address X, the Gateway needs to search the Routing Table for the route leading to X. Note that multiple subnets that contain X are often present in the Routing Table, so multiple candidate routes are possible. The Gateway chooses from among these candidate routes by the "best-match" semantics: the most specific route is chosen. In other words, the Gateway selects the candidate route that refers to the smallest subnet (in terms of how many IP addresses belong to it) from among the candidate routes.

A Routing Table usually (but not always) has a special route called the Default Route. This is the route that is selected if no other route applies to some IP address X. In some implementations, the Default Route is identified by a special keyword such as "default" in the Routing Table's printable format. In other implementations the Default Route is identified by the IP address 0.0.0.0 with a netmask 0.0.0.0 (i.e., all the bits are "don't-care" bits)—this is the case in the example of FIG. 1. A typical Gateway has its Default Route pointing toward the public Internet. However, a default route may be intentionally missing if the routing policy at the Gateway allows no traffic to the Internet.

Invention Overview

The information about which IP address is located behind each of the Gateway's network interface cards (NIC) is encoded in the Gateway's Routing Table (See FIG. 1). However, Routing Table entries are rarely disjoint: It is common to have many overlapping Routing Table entries that cover the same IP address. The "best-match" semantics of a Routing Table determine which route entry is used for a given IP address: it is the most specific one, i.e., the entry for the smallest subnet that contains the given IP address is the one that determines the route to that IP address.

The current invention discloses an efficient method that accepts a Gateway's Routing Table as input, and produces a list of Disjoint Zones, each Zone associated with a Zone Type, as output.

The method described herein consists of three phases. The phase numbers refer to FIG. 2:

The "Zone Identification" phase 200
The "Identify External Zone" phase 300
The "Modify Topology" phase 400

Each of these phases is described in detail below.

Zone Identification Phase (200)

The "Zone Identification" phase 200 uses the notion of Critical Points of a Routing Table. Intuitively, a Critical Point is an IP address at which the routing decision may change. Precisely, a Critical Point in a Routing Table is defined to be an IP address that meets one of the following conditions:

1. The IP address 0.0.0.0, or
2. The first (lowest) IP address in the subnet of some route in the Routing Table, or 3. The IP address that immediately follows the last (highest) IP address in the subnet of some route in the Routing Table.

For instance, if the Routing Table has routes to the following subnets:

IP address=10.0.0.0, netmask=255.0.0.0
IP address=10.0.0.0, netmask=255.255.0.0

Then the following IP addresses are Critical Points: 0.0.0.0 (by condition 1), 10.0.0.0 (by condition 2, lowest in both routes), 10.1.0.0 (by condition 3, immediately follows the highest IP address of the second route) and 11.0.0.0 (by condition 3, immediately follows the highest IP address of the first route).

A key observation is that if one sweeps over all possible IP addresses, starting from 0.0.0.0, in increasing order, then the routing decision at any IP address X can only differ from the routing decision at IP address X−1 if X is a Critical Point of the Routing Table.

The "Zone Identification" phase 200 consists of the following steps (Refer to FIG. 3):

1. Input: The Gateway's Routing Table R (100)
2. Identify the directly-connected subnets.
3. Associate a NIC with every route in the Routing Table.
4. Identify and sort the Routing Table's Critical Points.
5. Compute the Disjoint Zones.

The details of these steps are described in the following subsections.

Input Format

The input to the Zone Identification (200) phase is a file R (100) containing the Gateway's Routing Table. For example, the Routing Table R 100 may be the output of a command such as "netstat" (on Unix) or "route print" (on Microsoft Windows). Other Routing Table formats may be used without changing this invention.

Identify the Directly-Connected Subnets (205)

This step builds a lookup table D (210) indexed by the Gateway's NICs, said lookup table D (210) listing the directly-connected subnets attached to each NIC. A directly-connected subnet is marked as such in the Routing Table R 100 (e.g., by a keyword such as "directly connected" or by some equivalent marker). At the end of this step, for each NIC I the lookup table D(I) lists the subnet that is directly-connected via interface I.

Associate a NIC with Every Route (215)

This step builds an Annotated Routing Table T 220, which contains an entry for each route in R 100. Each entry in the Annotated Routing Table T220 contains a copy of all the fields associated with the same route in R 100. In addition, every route in T 220 also includes a field listing the NIC over which the route leads. The value placed in the NIC field is set using the lookup table D 210 and the Routing Table R 100, as follows. For a directly-connected subnet s1, set T(s1).NIC to be the NIC that connects the Gateway to s1. For a non-directly-connected subnet s2, let g(s2) denote the next-hop Gateway associated with s2 in R, and let I denote the NIC for which the subnet D(I) contains g(s2). Then set T(s2).NIC=I.

Identify the Critical Points (225)

For a subnet s, let low(s) denote the first (lowest) IP address in s, and let high(s) denote the last (highest) IP address in s. The input of this step is the Routing Table 100. The output of this step is a set of Critical Points C (230).

The Identify Critical Points (225) step employs the following procedure:

1 Set C (230) to be empty.
2 Insert the IP address 0.0.0.0 into C (230).
3 Loop over all the routes in R (100). For each subnet s comprising a route in R (100):
 3.1 insert the IP address low(s) into C (230).
 3.2 insert the IP address high(s)+1 into C (230).
  (use IP address arithmetic in which 10.0.0.255+1=10.0.1.0)
Notes:
In a preferred embodiment of this invention, the insertions in steps 3.1 and 3.2 above ignore duplicates (only a single copy of any IP address is maintained in C (230)).
The operation "high(s)+1" is done on IP addresses, e.g., 10.1.2.255+1=10.1.3.0.

Sort the Critical Points (235)

The input of this step is the set of Critical Points C (230). The output of this step is the array of Sorted Critical Points SortedC (240).

The Sort the Critical Points (235) step employs a standard sort procedure to sort the Critical Points in C (230) in increasing order of IP addresses: e.g., IP address 10.0.255.9 is before IP address 10.0.255.10, which in turn is before IP address 10.1.0.0. The sorted list of addresses is placed in the SortedC 240 array.

In an alternative embodiment of this invention, steps "Identify the Critical Points (225)" and "Sort the Critical Points (235)" may also be implemented as follows:

1 The insertions in 3.1 and 3.2 of the Identify Critical Points (225) step do not ignore duplicates: Thus in the alternative embodiment, the set of Critical Points C (230) may contain the same IP address multiple times
2 IN the alternative embodiment, the duplicate appearances of the same IP address are removed from the array of Sorted Critical Points SortedC (240) after it is sorted, e.g., by using the Linux command "uniq".

Compute the Disjoint Zones (250)

This step uses a sweep algorithm (245). The sweep algorithm uses a module RoutingDecision(T,X) 255 that computes the best-match routing decision for an IP address X using the Annotated Routing Table T 220. Specifically, if RoutingDecision(T,X) 255 returns I it means that a packet destined for IP address X is routed over interface I according to the Annotated Routing Table T.

The RoutingDecision(T,X) 255 module may be reduced to practice using various well known data structures and algorithms, such as those described in [Huitema'2000].

Intuitively, the sweep algorithm 245 works as follows. The sweep algorithm 245 loops over the array of sorted Critical Points SortedC 240 in increasing order of IP address. For each Critical Point X, the algorithm computes the routing decision using the RoutingDecision(T,X) 255 module. Said routing decision is kept in the form of the name of the NIC behind which IP address X is located. If the routing decision at X differs from that at the previous Critical Point, then a range of IP addresses is added to the Zone behind the previous Critical Point.

Precisely, the sweep algorithm (245) employs the following procedure:

1 low=undef; previous_nic=undef
2 for all NICs I set the Zone Z(I) in the Zone List 280 as Z(I) =empty -continued

```
3       for all Critical Points X in SortedC 240 in increasing order of
        IP addresses do
3.1       I = RoutingDecision(T,X) 255
3.2       if(I != previous_nic) then
3.2.1       if X != 0.0.0.0 then insert the range [low, X-1] into the Zone
            Z(previous_nic)
3.2.2       low = X
3.2.3       previous_nic = I
3.3       endif
4       enddo
5       insert the range [low, 255.255.255.255] into the Zone Z
        (previous_nic)
6       Output: the Zone List Z (280)
```

Identify the EXTERNAL Zone (300)

An additional feature of this invention involves marking the Zone Types. This is done in two phases. The first phase is an automatic (default) marking, which is described in this section. The second phase is manual and is described in "Modify Zone Types (400)" below.

Recall that a Routing Table usually (but not always) has a special route called the Default Route. This is the route that is taken if none of the other routes applies to a given the IP address. A typical Gateway has its Default Route pointing toward the public Internet. Therefore, the "Identify the EXTERNAL Zone (300)" phase marks as EXTERNAL the Zone connected to the NIC associated with the default route.

Some Gateway implementation (for example, the Cisco PIX firewall) let the administrator attach "trust levels" to each interface. Therefore, as an option of this invention, when analyzing such a Gateway, the "Identify the EXTERNAL Zone (300)" phase marks the EXTERNAL Zone as the Zone attached to the NIC with the lowest trust level (instead of according to the Default Route). This is since the user-supplied trust levels are much more accurate in identifying the real EXTERNAL Zone.

The method we use in the "Identify the EXTERNAL Zone (300)" phase is as follows:

```
1       If the Gateway supports "trust levels" then
1.1       Ext_Zone = Zone attached to the NIC that has the minimal
          trust-level
2       Else if there exists a Default Route then
2.1       Ext_Zone = Zone attached to the NIC that is associated
          with the Default Route
3       Else
3.1       Ext_Zone = undefined
4       If Ext_Zone is not undefined then
4.1       type(Ext_Zone) = EXTERNAL
5       for all Zone Z != Ext_Zone
5.1       type(Z) = INTERNAL
```

Note that at the end of the "Identify the EXTERNAL Zone (300)" phase, at most one Zone is marked with a type of EXTERNAL, and all the other are marked INTERNAL.

Modify Zone Types (400)

There are cases in which the automatic Zone types that are marked according to the method of "Identify the EXTERNAL Zone (300)" are inaccurate. Three example cases are:

Sometimes the Gateway does not have a default route (intentionally) since it should not route traffic to the Internet.

Sometimes the default route is present, but it points inward, toward the organization's INTERNAL networks—this occurs when the Gateway is connected to a business partner and the organization does not want to route Internet traffic through the partner's network.

Sometimes there are multiple Zones that should considered to be EXTERNAL, e.g., when the Gateway has several connections that lead to the Internet.

Furthermore, some Zones are neither EXTERNAL nor INTERNAL: they include DMZ networks.

In all such cases, an option of this invention allows the user to manually edit the Zone Types, and mark each Zone with the appropriate Zone Type. In a preferred embodiment, the editing is performed using a Graphical User Interface (GUI). Such a GUI allows the user to view the Zones on his computer terminal, see their current Types, and modify said Types by using the computer mouse or computer keyboard or both.

I claim:

1. A method of analyzing a routing table of an IP Gateway for identifying sets of IP addresses communicating through a Gateway, wherein said routing table includes a plurality of routes, wherein each route includes an IP address range including at least one destination IP address, wherein each route is associated with at least one predefined network interface card (NIC) enabling communication over at least one local area network (LAN) between an IP gateway of the routing table and a destination gateway directing to a destination address, said method comprising:

identifying critical points in the routing table with a processor, wherein each critical point is an IP address within a Route that represents a routing transition from one destination gateway to another; and defining disjoint zones, wherein each disjoint zone is a set of destination IP addresses, wherein each destination IP address from the routing table is associated with a single disjoint zone, wherein all the destination IP addresses associated with said zone are further associated with the same NIC, and wherein defining of each said disjoint zone is carried out by using said critical points.

2. The method of claim 1, further comprising sorting the identified Critical Points in ascending order of IP addresses.

3. The method of claim 1, further comprising identifying and eliminating duplicate Critical Points.

4. The method of claim 1, wherein a sweep algorithm is used to identify the Critical Points, wherein said sweep algorithm enables looping over an array of sorted Critical Points in an increasing order of IP addresses, wherein for each Critical Point "X", the algorithm computes a routing decision, which is indicated by the NIC behind which the Critical Point "X" is located, wherein if the routing decision at Critical Point "X" differs from a routing decision at a previous Critical Point, a range of destination IP addresses is added to the range behind the previous Critical Point, which defines the range associated with a gateway, which is different than the gateway with which the previous range is associated.

5. The method of claim 4, wherein the sweep algorithm employs a module that emulates the routing decision of the Gateway.

6. The method of claim 1, further comprising associating a Zone Type to each disjoint zone, wherein said Zone Type is one of: an external zone; an internal zone; or a demilitarized zone (DMZ), wherein said external zone type represents addresses ranges that direct to external networks, said internal zone type represents address ranges that direct to internal networks and said DMZ type represents IP addresses that are used for publicly-available servers.

7. The method of claim 6, further comprising identifying a level of security, which defines the zone types in accordance with trust levels as defined by a Gateway administrator.

8. The method of claim 6, further comprising enabling the user to define the Zone Types in accordance with his preferences using a graphical interface.

9. A system for analyzing a routing table of an IP Gateway for identifying sets of IP addresses communicating through a Gateway, said system comprising:
- a routing table that consists of a plurality of routes, wherein each route includes an IP address range including at least one destination IP address, wherein each route is associated with at least one predefined network interface card (NIC) enabling communication over at least one local area network (LAN) between an IP gateway of the routing table and a destination gateway directing to a destination address;
- a memory for storing computer readable code and data which is executed by a processor;
- at least one processor for processing data, operatively associated with said memory; and
- a computer readable module enabling to receive and process data from the routing table for identifying disjoint zones, which are sets of destination IP addresses directed through the same destination gateway,
- wherein the identification of said disjoint zones is carried out by identifying critical points in the routing table, wherein each critical point is an IP address within a route that represents a routing transition from one destination gateway to another;
- wherein each destination IP address from the routing table is associated with a single disjoint zone, wherein all the destination IP addresses associated with said zone are further associated with the same NIC, and
- wherein defining of each said disjoint zone is carried out by using said critical points.

* * * * *